United States Patent [19]

Fanton et al.

[11] Patent Number: 5,181,080
[45] Date of Patent: Jan. 19, 1993

[54] METHOD AND APPARATUS FOR EVALUATING THE THICKNESS OF THIN FILMS

[75] Inventors: Jeffrey T. Fanton, Los Altos; Jon Opsal, Livermore; Allan Rosencwaig, Danville, all of Calif.

[73] Assignee: Therma-Wave, Inc., Fremont, Calif.

[21] Appl. No.: 813,900

[22] Filed: Dec. 23, 1991

[51] Int. Cl.$^5$ ............................................. G01B 11/06
[52] U.S. Cl. ..................................... 356/381; 356/128; 356/369; 356/446
[58] Field of Search ............... 356/128, 351, 364, 369, 356/381, 382, 446; 250/225

[56] References Cited

U.S. PATENT DOCUMENTS 4,999,014 3/1991 Gold et al. ............................ 356/382
5,042,951 8/1991 Gold et al. ............................ 356/369

Primary Examiner—F. L. Evans
Attorney, Agent, or Firm—Limbach & Limbach

[57] ABSTRACT

A method and apparatus is disclosed for measuring the thickness or other optical constants of a thin film on a sample. The apparatus includes a laser for generating a linearly polarized probe beam. The probe beam is tightly focused on the sample surface to create a spread of angles of incidence. The reflected probe beam is passed through a quarter-wave plate and linear polarizer before impinging on a quad cell photodetector. The output signals from the photodetector represent an integration of the intensity of individual rays having various angles of incidence. By taking the difference between the sums of the output signals of diametrically opposed quadrants, a value can be obtained which varies linearly with film thickness for very thin films. The subject device can be used in conjunction with other prior devices to enhance sensitivity for thicker films.

34 Claims, 2 Drawing Sheets

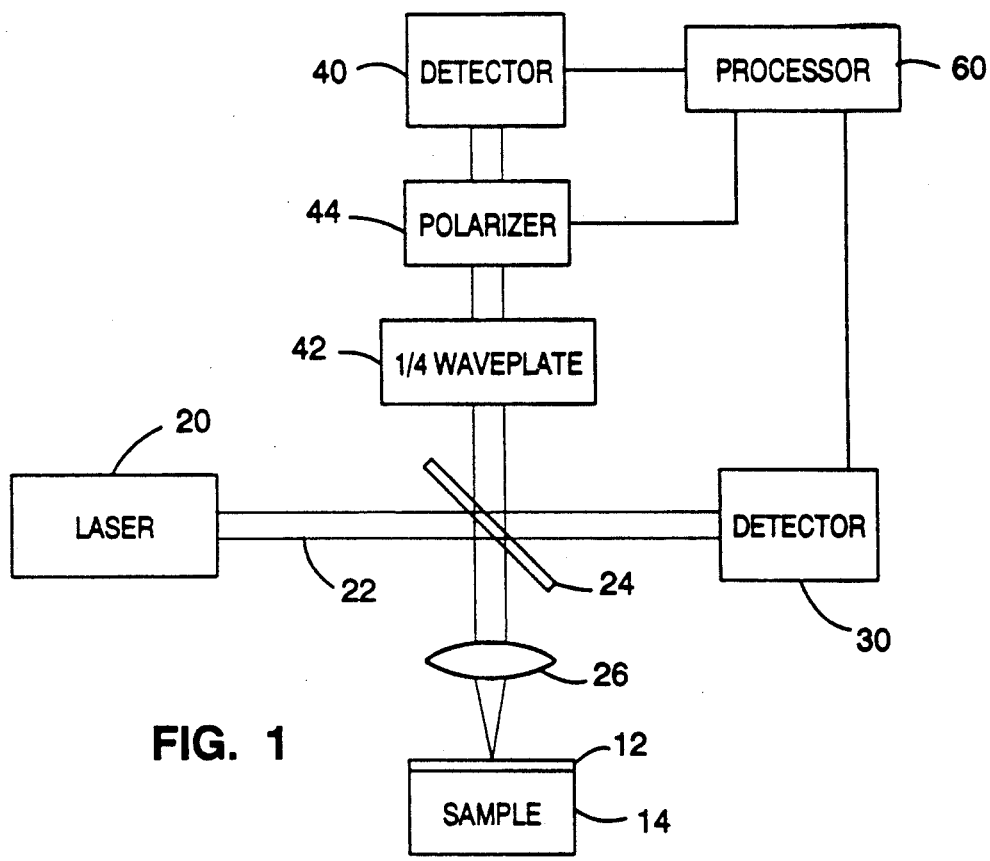
FIG. 1
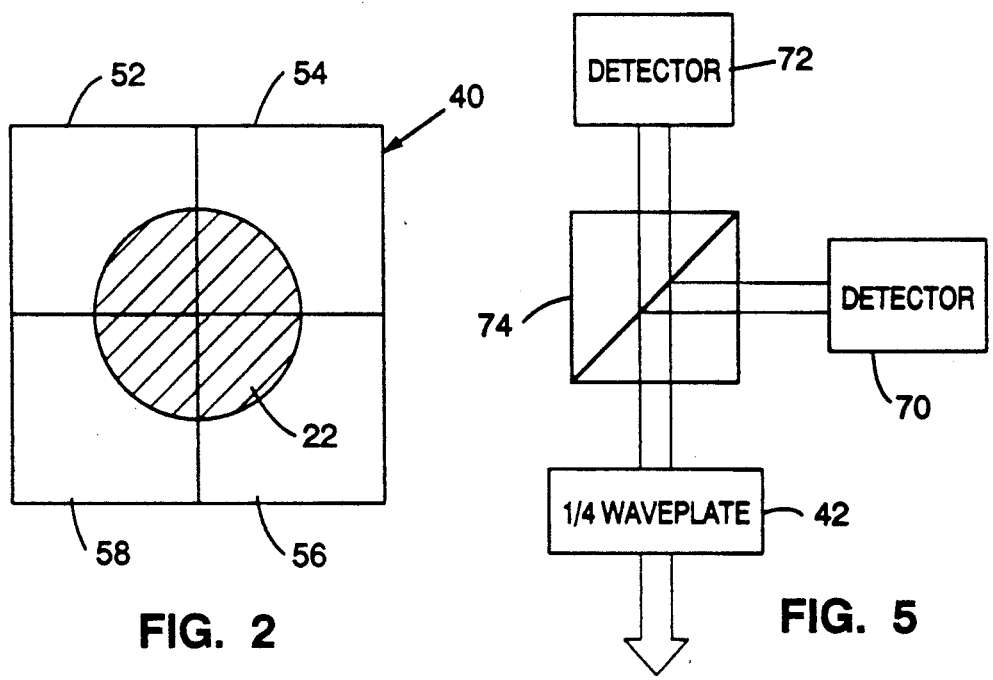
FIG. 2
FIG. 5

5,181,080

METHOD AND APPARATUS FOR EVALUATING THE THICKNESS OF THIN FILMS

TECHNICAL FIELD

The subject invention relates to an apparatus for evaluating the thickness or optical constants of thin films. The subject invention is particularly useful in measuring films that are less than 100 Å thick.

BACKGROUND OF THE INVENTION

There is considerable interest in developing systems for accurately measuring the thickness of thin films and the optical constants of those thin films. The need is particularly acute in the semiconductor manufacturing industry where the thickness of thin film oxide layers on silicon substrates are measured. To be useful, the measurement devices must be able to determine the thickness of films with a high degree of accuracy and be able to make the measurements within very localized areas (i.e. on the micron scale).

One such device that achieves these goals has been recently introduced by the assignee herein under the trademark Optiprobe. The approach used to obtain the measurements in this device is described in detail in commonly owned U.S. Pat. No. 4,999,014, issued Mar. 12, 1991, to Gold et. al. and incorporated herein by reference.

As described in this patent, a high power, spherical, microscope objective is used to tightly focus a probe beam substantially normal to the surface of the sample in a manner to create a spread of angles of incidence. An array of discrete photodetector elements is provided to measure the intensity of individual rays within the reflected probe beam. These individual rays correspond to discrete angles of incidence with respect to the surface of the sample. Using the angularly dependent intensity measurements, the processor can evaluate the parameters of the thin film. Parameters such as layer thickness and index of refraction can be determined using the Fresnel equations.

Some of the fundamental concepts that were disclosed in U.S. Pat. No. 4,999,014 were extended to develop a high resolution ellipsometer which is described in commonly owned U.S. Pat. No. 5,042,951, issued Aug. 27, 1991, to Gold et. al. and incorporated herein by reference. In this device, the change in polarization state of the probe beam, caused by the reflection off the surface of the sample, was analyzed so that the conventional ellipsometric parameters could be used to evaluate the sample. As in the earlier cited patent, the detector arrangement in the ellipsometer included an array of discrete detector elements so that angularly dependent intensity measurements could be made.

Both of the devices as described above provide information about thin film layers. However, and as described in both patents, additional accuracy can be obtained by measuring not only the angularly dependent intensity of the rays with an array of discrete elements, but in addition, by measuring the full power of the reflected probe beam. The advantage to measuring the full power of the reflected probe beam is that it provides a much better signal to noise ratio. It should be noted that a measurement of the full power of the reflected probe beam could not be used to determine thin film thickness alone, since this signal is not linear, but varies sinusoidally with thickness. However, if the approximate thickness can be derived using the angular dependent intensity measurements, the actual thickness can be more accurately determined using the additional full power measurement.

In practice, using both angular dependent intensity detection and full probe beam power detection, accurate measurement of the thickness and optical constants of thin films down to 100 Å has been achieved. Below 100 Å, the interference effects of the film are so small that the signal to noise ratio associated with the discrete element photodetector makes analysis by angular dependent intensity measurements difficult. In addition, the sensitivity of the standard full power measurement in the region below 100 Å is also low.

Therefore, it is an object of the subject invention to provide an approach for measuring the thickness of films less than 100 Å thick.

It is another object of the subject invention to provide an apparatus for determining the optical constants of films less than 100 Å thick.

It is a further object of the subject invention to provide a device for evaluating parameters of a thin film with micron scale resolution.

It is a further object of the subject invention to provide a method and apparatus which can be used in conjunction with existing systems to further refine the measurement of the thickness and optical constants of thin films.

SUMMARY OF THE INVENTION

In accordance with these and other objects, a method and apparatus is disclosed for evaluating parameters of thin films. The apparatus includes a means for generating a probe beam of radiation. A high power, spherical, microscope objective is used to tightly focus the beam substantially normal to the surface of the sample to create a spread of angles of incidence. The probe beam is preferably focused to a spot less than a micron in diameter. A means is provided for retarding the phase of one polarization state of the beam with respect to the other. In the illustrated embodiment, where the probe beam is initially linearly polarized, a quarter-wave plate is used to retard the phase of one polarization state of the reflected probe beam by ninety degrees.

The reflected beam is then passed through a linear polarizer to create interference between the two polarization state components. The power of the beam is measured by a photodetector along two orthogonal axes. In the preferred embodiment, a quad cell is used having four radially disposed quadrants. Each quadrant will receive all the rays having different angles of incidence and generate an output signal of total power that effectively integrates the angular intensity measurements. As will be described in greater detail below, because of the geometry of the optical components, the power in each quadrant will be the same except for one term which will be positive for one set of diametrically opposed quadrants and negative for the remaining quadrants. By subtracting the sum of the outputs of the diametrically opposed quadrants, a signal can be obtained which is linearly proportional to the thickness of the thin film.

Since the signal in each quadrant of the detector derives its magnitude from the power in an entire quadrant of the beam, the signal to noise ratio will be better than that achieved using only small discrete detectors that measure intensity only at specific points within the beam. Further, since the measurement includes information over a range of angles of incidence, the signal is highly sensitive in the region of thin film thickness below 100 Å. This result can be compared to the low level of sensitivity available in a standard full power measurement.

Although the sensitivity of this method, similar to the full power measurement, varies sinusoidally with thickness, it has been found that the subject measurement will also be useful above 100 Å. More particularly, in film thickness regions between zero and 5000 Å, the sensitivity of this method is greatest in those regions where the full power measurement is a minimum. Accordingly, the subject method can be advantageously implemented with the angular dependent measurements described above to further refine the analysis in thickness regions where the total power measurement is less sensitive.

It should be understood that since this approach functions to integrate the angular intensity measurements, information available by measuring individual rays will be lost. Thus, a detailed analysis of the parameters of very thin films would be difficult based on this measurement alone. However, the measurements derived from this approach can be compared to known samples to give a highly accurate assessment of the specific parameters of very thin films. In most cases, the unknown parameter to be evaluated will be the thickness of the thin film. If the thickness is known, the system can be used to determine another optical constant such as the index of refraction of the thin film.

Further objects and advantages of the subject invention will become apparent from the following detailed description taken in conjunction with the drawings in which:

BRIEF DESCRIPTION OF THE DRAWINGS

FIG. 1 is a block diagram of the apparatus of the subject invention.

FIG. 2 is a schematic diagram of the surface of a quad cell photodetector used in the subject invention.

FIG. 5 is a block diagram of an alternate embodiment configured to minimize errors due to asymmetries in the probe beam.

DETAILED DESCRIPTION OF THE PREFERRED EMBODIMENTS

Figure 3:
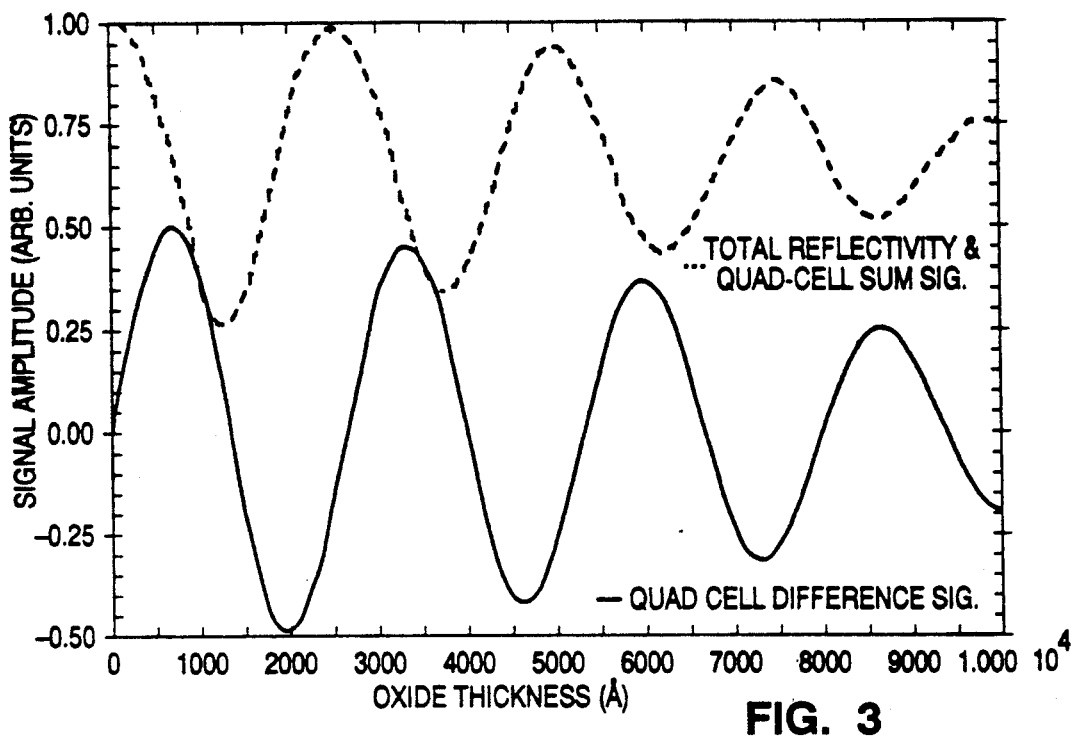
FIG. 3 is a graph illustrating a comparison of the variation in the amplitude of the output signal with respect to oxide layer thickness for a detector that measures total reflectivity and one that measures the signals in accordance with the subject invention (quad-cell difference signal).

Turning to FIG. 1, an apparatus 10 is illustrated for performing the method of the subject invention. The apparatus 10 is designed to evaluate the thickness of a thin film layer 12 on a sample 14. In particular, the apparatus is capable of measuring the thickness of a thin film oxide layer on a silicon substrate.

Apparatus 10 includes a laser 20 for generating a probe beam 22 of radiation. One suitable laser source is a solid state laser diode which emits a linearly polarized beam. Such a laser is available from Toshiba, model TLD 9211 having a 3 milliwatt power output at 670 nm.

Probe beam 22 is turned towards the sample 14 with a 50/50 beam splitter 24. The probe beam is focused onto the surface of the sample with a lens 26. In the preferred embodiment, lens 26 is defined by a spherical, microscope objective with a high numerical aperture on the order of 0.90 NA. The high numerical aperture functions to create a large spread of angles of incidence with respect to the sample surface. The spot size is on the order of one micron in diameter.

A fraction of the probe beam power also passes through splitter 24 and falls on an incident power detector 30. As discussed in the above cited patents, the incident power detector 30 is provided to monitor fluctuations in the output power of the probe laser. As will be discussed below, the incident power detector can be modified for this invention to minimize measurement errors which arise due to asymmetries of the beam.

Light reflected from the surface of the sample passes up through splitter 24 towards photodetector 40. Prior to reaching detector 40, the beam 22 is passed through a quarter-wave plate 42 for retarding the phase of one of the polarization states of the beam by 90 degrees. It should be noted that the quarter-wave plate could be located in the beam path prior to the probe beam striking the sample so that the system would operate with circularly polarized light. The latter approach might have some advantages in reducing the aberrations created by lens 26. In addition, while a phase retardation of 90 degrees will maximize the desired signal, other intermediate levels of retardation would be possible.

The beam is then passed through a linear polarizer 44 which functions to cause the two polarization states of the beam to interfere with each other. In order to maximize the desired signal, the axis of the polarizer should be oriented at an angle of 45 degrees with respect to the fast and slow axes of the quarter-wave plate 42.

In accordance with the subject invention, detector 40 is configured to generate independent signals from regions along two orthogonal axes. In the preferred embodiment, this goal is achieved by using a quad cell photodetector. As illustrated in FIG. 2, the detector surface includes four radially disposed quadrants 52, 54, 56 and 58. Each quadrant will generate an output signal proportional to the magnitude of the power of probe beam striking the quadrant. This signal represents an integration of the intensities of all the rays having different angles of incidence with respect to the sample surface. While this integration approach results in the loss of some information content as compared to an analysis of individual rays, the composite approach does provide significantly greater sensitivity through enhanced signal to noise performance.

The probe beam 22 should be centered on the detector so that each quadrant intercepts one quarter of the probe beam. The probe beam should underfill the detector.

As noted above, the geometry of the optical elements results in creating a signal response that can be processed to form a result that varies linearly with layer thickness. This response can be understood from the following analysis which is described with reference to linearly polarized light. As noted above, the system can operate with circularly polarized light as well.

In the following analysis, it is assumed that the incident light has the form $E_i(r,\phi)\hat{e}_x$ where r is the radial distance from the center of the beam and $\phi$ is the angle relative to the x-axis. After passing through the objective lens 26, reflecting off of the sample surface, and returning through the lens, the electric field will be spatially dependent and have the form $$E_R(r,\phi) = E_i(r,\phi)\{(R_p\cos^2\phi + R_s\sin^2\phi)\hat{e}_x + (R_p - R_s)\sin\phi\cos\phi\hat{e}_y\} \quad (1)$$

where $\hat{e}_x$ and $\hat{e}_y$ are the unit vectors along the x and y axes, $R_p$ is the complex p-wave amplitude reflection coefficient, and $R_s$ is the complex s-wave amplitude reflection coefficient. The radial position within the beam, r, is related to the angle of incidence upon the sample, $\Theta$, through the expression $r = d\sin\Theta$, where d is the focal length of the objective lens. $R_p$ and $R_s$ are functions of $\Theta$ and are independent of $\phi$.

If the beam 22 is passed through the quarter-wave retardation plate 42 oriented such that the x-component is retarded 90° relative to the y-component, and then is passed through the linear polarizer 44 oriented at angle $\alpha$ to the x-axis, the electric field will be of the form $$E_R(r,\phi,\alpha) = E_i[\cos\alpha(R_p\cos^2\phi + R_s\sin^2\phi)\hat{e}_x + \sin\alpha(R_p - R_s)\sin\phi\cos\phi\hat{e}_y] \quad (2)$$

The light intensity is equal to the square of the field magnitude, $I_r = |E_R|^2$. $I_R$ can be expressed in terms of the ellipsometric parameters $\Psi$ and $\delta$ through the following relationships:

$$\frac{R_p}{R_s} = \left|\frac{R_p}{R_s}\right| e^{i\delta} \quad (3)$$

and $$\tan\Psi = \left|\frac{R_p}{R_s}\right|. \quad (4)$$

Carrying out the expansion of $|E_R|^2$, we get $$I_R(r,\phi,\alpha) = I_i(r,\phi)|R_s|^2\{[\tan^2\Psi\cos^4\phi + \sin^4\phi]\cos^2\alpha + [\tan^2\Psi + 1]\sin^2\phi\cos^2\phi\sin^2\alpha + 2\tan\Psi\cos\delta\cos^2\phi\sin^2\phi(\cos^2\alpha - \sin^2\alpha) + 2\tan\Psi\sin\delta\cos\phi\sin\phi\cos\alpha\sin\alpha\} \quad (5)$$

For very thin films, $\tan\Psi$ is independent of thickness and $\delta$ is linearly proportional to the thickness. Hence, the last term in the above expression is of greatest interest. As noted above, this term is maximized when the analyzer angle, $\alpha$, is 45°.

The total power impinging on each quadrant of the photodetector is equal to the integral of $I_R$ over the quadrant. If the incident laser beam, $I_i$, is circularly symmetric, the power in each quadrant is given by $$P = \frac{\pi}{16}\int_0^{r_{max}}[(\tan^2\Psi + 1)(2\cos^2\alpha + 1) + 2\tan\Psi\cos\delta(2\cos^2\alpha - 1)] \cdot |R_s|^2 I_i(r) r\, dr \pm \cos\alpha\sin\alpha\int_0^{r_{max}} \tan\Psi\sin\delta |R_s|^2 I_i(r) r\, dr \quad (6)$$

The sign of the second integral is positive for quadrants 54 and 58 and negative for quadrants 52 and 56. If the signals from quadrants 52 and 56 are summed and subtracted from the sum of the signals from quadrants 54 and 58, the remainder will have a simple form that is linearly proportional to film thickness for thin films:

$$S = 2\cos\alpha\sin\alpha \int_0^{r_{max}} \sin\delta\tan\Psi |R_s|^2 I_i(r) r\, dr \quad (7)$$

$$= \int_0^{r_{max}} \sin\delta\tan\Psi |R_s|^2 I_i(r) r\, dr \text{ for } \alpha = 45°. \quad (8)$$

For very thin films or small $\delta$ then $$S \approx \int_0^{r_{max}} \delta\tan\Psi |R_s|^2 I_i(r) r\, dr \quad (9)$$

Figure 4:
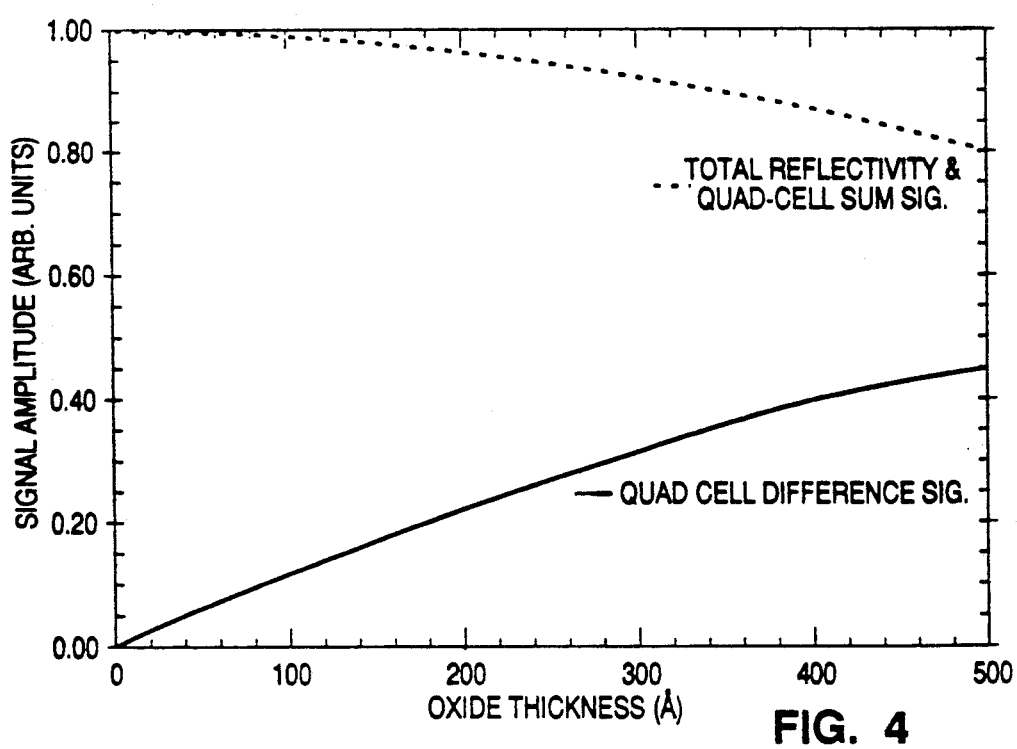
FIG. 4 is an enlarged version of the graph of FIG. 3 illustrating the signal in the region of oxide thickness below 500 Å.

The graphs in FIGS. 3 and 4 illustrate the variation of the output signal S with thickness for a silicon oxide ($SiO_2$) film on a silicon (Si) substrate. The incident laser beam was assumed to have a Gaussian intensity profile and the numerical aperture of the objective lens was 0.9. For comparison, the sum of the four quadrants is also shown which corresponds to the total reflectivity measurement described in the above cited patents.

These curves demonstrate the superior sensitivity of the quad-cell difference signal for films thinner than 100 Å. They also show that the sum and difference signal techniques are complementary. More specifically, when the difference signal is at a peak or valley, and thus where its thickness sensitivity is at a minimum, the total reflectivity signal has a steep slope. Conversely, when the total reflectivity signal is at a peak or valley, the difference signal has a steep slope. Thus, by using a combination of the two techniques, it is possible to take full advantage of the signal-to-noise benefits of large-area detection for all thicknesses from 0 Å to at least 5000 Å.

To carry out the analysis, the output signals from the detector 40 are supplied to a processor 60. Processor 60 functions to find the difference between the sums of the signals from diametrically opposed quadrants 52, 56 and 54, 58. The difference value can be compared with a calibration table of values for known thicknesses. As can be seen from FIG. 4, there is a significant variation in signal in the region below 500 Å so that accurate measurements can be made. In the case where thickness of the film is known, the difference signal could be used to determine the other optical constants of the film, specifically the index of refraction and the extinction coefficient.

In the broadest sense, the quad-cell difference signal provides a single, very accurate measurement of the ellipsometric parameter $\delta$ (when measuring very thin films) which is related to the optical thickness (nt) in thin films and the extinction coefficient of the substrate and can be used to evaluate either parameter. For thicker films, the information provided by the quad-cell difference signal is a complicated function of $\Psi$ and $\delta$, but the point remains that the difference signal can be used to refine the calculation of any unknown quantity (thickness, index of refraction or extinction coefficient) given the others.

It is envisioned that the subject approach will be incorporated into the devices described in the above cited patents. This incorporation can be very straightforward since the devices described above were already equipped with most of the elements necessary to carry out the subject invention. Significantly, the prior devices both included a full power detector (element 340 in both patents). This standard full power detector can be replaced with a quad cell detector. As can be appreciated, if a full power measurement is desired, all four quadrants can be summed. In contrast, if a difference signal is desired in accordance with the subject approach, the processor can subtract the sums of the diametrically opposed quadrants. The prior devices would be further modified by the addition of the appropriate retardation and polarizing elements.

It is envisioned that for films having thicknesses greater than 100 Å, the initial evaluation would be based on the angularly dependent intensity measurements. Refinement of the measurement would be made using either the full power measurement or the subject difference measurement. The choice will be based on the sensitivity of the signal in the particular thickness region being measured.

The mathematical analysis set forth above assumed that the probe beam was circularly symmetrical or independent of $\phi$. If it is not, the leading terms in equation (5) will not cancel upon subtraction. This residual term introduces an offset in thin-film measurements and thereby complicates the interpretation of the results. Furthermore, the extra term can degrade the signal-to-noise of the device since it increases the noise level without contributing useful information about the film thickness. Various signal processing techniques can be used to minimize such errors.

One approach to minimizing such errors would be to rotate the linear polarizer 40 and record the signals at $\alpha=0°$ and $\alpha=90°$. From the expression for $I_R$, equation (5), it can be seen that $$I_R(r,\phi,\alpha=45°) = \tfrac{1}{2}\{I_R(r,\phi,\alpha=0°) + I_R(r,\phi,\alpha=90°)\} + \sin\delta\tan\Psi\cos\phi\sin\phi I_i(r,\phi)|R_s|^2 \quad (10)$$

By subtracting 0° and 90° signals from the 45° signal, the term proportional to small $\delta$ can be isolated. Since the subtraction is done for each individual quadrant, circular asymmetry will not effect the result. As indicated in FIG. 1, rotation of polarizer 44 can be placed under the control of the processor 60.

A second approach is illustrated in FIG. 5. In this approach, two identical quad-cell detectors 70 and 72 are used simultaneously to measure the right and left-handed circular components of the reflected beam. This can be accomplished most directly by replacing the final linear polarizer 44 with a polarizing beam splitter 74. After passing through the polarizing beam splitter 74, two beams are created. One beam will be the right-handed component and the other will be the left-handed component. The power hitting the two quad cells is identical except for a sign change in the term linear in small $\delta$. By this arrangement, a subtraction of the signal generated by one quadrant in one detector from the signal generated by the corresponding quadrant in the other detector will produce a result that is linear for thin films. The signal can be maximized by performing a quadrant by quadrant subtraction and summing the result.

While either of the above two techniques will guarantee the removal of terms insensitive to small $\delta$, the remaining linear term will still be weighted by any asymmetry of the beam through its dependence on $I_i(r,\phi)$. For the most part, the r and $\phi$ dependence of the incident light can be calculated by measuring the signals from known samples and comparing them to theory. However, to keep track of dynamic changes in the incident beam, it is necessary to monitor the incident intensity with a separate photodetector.

In the devices described in the above cited patents, a single photodetector measures the total intensity of the incident beam to remove the effects of the variation in the intensity of the beam generated by the laser. This concept can be extended by modifying the incident beam detector to a quad cell detector (shown as 30 in FIG. 1). By using a quad cell detector, small changes in the symmetry of the incident beam can also be measured. By individually normalizing the signals from the quadrants of detector 40 with the incident power measured in the corresponding quadrants of detector 30, the effects of symmetry changes can be greatly reduced.

In summary, there has been disclosed a method and apparatus for evaluating a parameter of a thin film. The apparatus includes a linearly polarized probe laser beam which is tightly focused on the sample surface to create a spread of angles of incidence. The reflected probe beam is passed through a quarter-wave plate and a linear polarizer before impinging on a quad cell photodetector. The output signals from the photodetector represent an integration of the intensity of individual rays having various angles of incidence. By taking the difference between the sums of the output signals of diametrically opposed quadrants, a value can be obtained which varies linearly with film thickness for very thin films. The subject device can be used in conjunction with other prior devices to enhance sensitivity for thicker films.

While the subject invention has been described with reference to the preferred embodiments, various changes and modifications could be made therein, by one skilled in the art, without varying from the scope and spirit of the subject invention as defined by the appended claims.

We claim:

1. An apparatus for evaluating a parameter of a thin film on the surface of a sample comprising:

means for generating a probe beam of radiation;

means for focusing the probe beam substantially normal to the surface of the sample such that various rays within the focused probe beam create a spread of angles of incidence;

means for retarding the phase of one polarization state in the probe beam with respect to the phase of the other polarization state in the probe beam;

polarizing means for creating interference between the two polarization states in the probe beam after the probe beam has been reflected from the surface of the sample;

detector means for measuring the power of the reflected probe beam along two orthogonal axes after it has passed through the retarding and polarizing means, said detector means generating an output that integrates the intensity of various rays having different angles of incidence, said output having two components corresponding to said two orthogonal axes; and processor means for evaluating a parameter of the thin film on the sample based on the output of the detector means.

2. An apparatus as recited in claim 1 wherein said detector means is a photodetector having four radially disposed quadrants.

3. An apparatus as recited in claim 2 wherein said processor means functions to derive a measurement value by calculating the difference between the sums of the outputs of diametrically opposed quadrants.

4. An apparatus as recited in claim 3 wherein said processor means further functions to compare said derived measurement value to a known calibration table to determine the parameter of the thin film layer.

5. An apparatus as recited in claim 4 wherein said parameter is the thickness of the thin film.

6. An apparatus as recited in claim 4 wherein said parameter is an optical constant of the thin film.

7. An apparatus as recited in claim 6 wherein said optical constant is the index of refraction of the thin film.

8. An apparatus as recited in claim 6 wherein said optical constant is the index of refraction of the thin film.

9. An apparatus as recited in claim 1 wherein said retarding means is defined by a quarter-wave plate.

10. An apparatus as recited in claim 9 wherein the quarter-wave plate is positioned in the beam path after the beam has been reflected from the sample.

11. An apparatus as recited in claim 10 wherein the probe beam is linearly polarized prior to being focused on the sample surface.

12. An apparatus as recited in claim 9 wherein the axis of said polarizing means is oriented at a 45 degree angle with respect to the axes of the quarter-wave plate.

13. An apparatus as recited in claim 12 wherein said processor means further functions to rotate said polarizing means and record additional measurements from said detector means when the axis of said polarizing means is oriented at both zero and 90 degrees with respect to the axes of the quarter-wave plate, said additional measurements being used to normalize the measurements made when the polarizing means is oriented at a 45 degree angle thereby minimizing errors attributable to asymmetries in the probe beam.

14. An apparatus as recited in claim 2 further including a second photodetector having four radially disposed quadrants and being identical to the first photodetector, and wherein said polarizing means is defined by a polarizing beam splitter for creating two partial beams with right and left-hand circular components, with one of said partial beams being measured by the first photodetector and with the other partial beam being measured by the second photodetector, with the processor means utilizing the output generated by the two photodetectors to normalize the measurements and minimize the effects of asymmetries in the probe beam.

15. An apparatus as recited in claim 2 further including a incident beam photodetector for measuring the power of the probe beam before it reaches the sample, and wherein the incident beam photodetector has four radially disposed quadrants and wherein said processor means utilizes the output generated by the incident beam photodetector to normalize the measurement of the reflected beam photodetector to minimize the effects of asymmetries in the probe beam.

16. An apparatus as recited in claim 1 wherein said probe beam is focused to a spot size of about one micron in diameter.

17. An apparatus for evaluating the thickness of a thin film on the surface of a sample comprising:

means for generating a linearly polarized probe beam of radiation;

means for focusing the probe beam substantially normal to the surface of the sample such that various rays within the focused probe beam create a spread of angles of incidence;

a quarter-wave plate for retarding the phase of one polarization state in the probe beam with respect to the phase of the other polarization state in the probe beam;

a linear polarizer for creating interference between the two polarization states in the probe beam after the probe beam has been reflected from the surface of the sample;

a photodetector having four radially disposed quadrants for measuring the power of the reflected probe beam after it has passed through the quarter-wave plate and polarizer, said photodetector generating an output from each quadrant that is proportional to the power of the probe beam incident on that quadrant; and processor means functioning to derive a measurement value by calculating the difference between the sums of the outputs of diametrically opposed quadrants, said measurement value being used to evaluate the thickness of the thin film on the sample.

18. An apparatus as recited in claim 17 wherein said processor means further functions to compare said derived measurement value to a known calibration table to determine the thickness of the thin film layer.

19. An apparatus as recited in claim 17 wherein the quarter-wave plate is positioned in the beam path after the beam has been reflected from the sample.

20. An apparatus as recited in claim 17 wherein the axis of said polarizer is oriented at a 45 degree angle with respect to the axes of the quarter-wave plate.

21. An apparatus as recited in claim 20 wherein said processor means further functions to rotate said polarizer and record additional measurements from said photodetector when the axis of said polarizer is oriented at both zero and 90 degrees with respect to the axes of the quarter-wave plate, said additional measurements being used to normalize the measurements made when the polarizer is oriented at a 45 degree angle thereby minimizing errors attributable to asymmetries in the probe beam.

22. An apparatus as recited in claim 17 further including a second photodetector having four radially disposed quadrants and being identical to the first photodetector, and wherein said polarizer is defined by a polarizing beam splitter for creating two partial beams with right and left-hand circular components, with one of said partial beams being measured by the first photodetector and with the other partial beam being measured by the second photodetector, with the processor means utilizing the output generated by the two photodetectors to normalize the measurements and minimize the effects of asymmetries in the probe beam.

23. An apparatus as recited in claim 17 further including an incident beam photodetector for measuring the power of the probe beam before it reaches the sample, and wherein the incident beam photodetector has four radially disposed quadrants and wherein said processor means utilizes the output generated by the incident beam photodetector to normalize the measurement of the reflected beam photodetector to minimize the effects of asymmetries in the probe beam.

24. An apparatus as recited in claim 17 wherein said probe beam is focused to a spot size of about one micron in diameter.

25. A method for evaluating a parameter of a thin film on the surface of a sample comprising:

focusing a probe beam of radiation substantially normal to the surface of the sample such that various rays within the focused probe beam create a spread of angles of incidence;

retarding the phase of one polarization state in the probe beam with respect to the phase of the other polarization state in the probe beam;

interfering the two polarization states in the probe beam after the probe beam has been reflected from the surface of the sample;

thereafter measuring the power of the reflected probe beam along two orthogonal axes and generating an output that integrates the intensity of various rays having different angles of incidence, said output having two components corresponding to said two orthogonal axes; and evaluating a parameter of the thin film on the sample based on the measured output.

26. A method as recited in claim 25 wherein said evaluation step includes comparing the measured output to a known calibration table to determine the parameter of the thin film layer.

27. A method as recited in claim 25 wherein said parameter is the thickness of the thin film.

28. A method as recited in claim 25 wherein said parameter is an optical constant of the thin film.

29. A method as recited in claim 28 wherein the optical constant is the index of refraction of the thin film.

30. A method as recited in claim 28 wherein the optical constant is the extinction coefficient of the thin film.

31. A method as recited in claim 25 wherein said probe beam is focused to a spot size of about one micron in diameter.

32. A method for evaluating the thickness of a thin film on the surface of a sample comprising:

focusing a probe beam of linearly polarized radiation substantially normal to the surface of the sample such that various rays within the focused probe beam create a spread of angles of incidence;

retarding the phase of one polarization state in the probe beam with respect to the phase of the other polarization state in the probe beam by 90 degrees;

polarizing the probe beam after the probe beam has been reflected from the surface of the sample using a linear polarizer;

thereafter measuring the power of the reflected probe beam in four radially disposed quadrants;

generating an output signal from each quadrant that is proportional to the power of the probe beam incident on that quadrant; and deriving a measurement value by calculating the difference between the sums of the outputs of diametrically opposed quadrants, said measurement value being used to evaluate the thickness of the thin film on the sample.

33. A method as recited in claim 32 further including the step of comparing said derived measurement value to a known calibration table to determine the thickness of the thin film layer.

34. A method as recited in claim 32 wherein said probe beam is focused to a spot size of about one micron in diameter.

* * * * *